(12) United States Patent
Dittmer (10) Patent No.: US 6,585,214 B1
(45) Date of Patent: Jul. 1, 2003

(54) EXTENDED TRAVEL LIFT MECHANISM FOR A FLAT PANEL DISPLAY

(75) Inventor: Jay Dittmer, Prior Lake, MN (US)

(73) Assignee: Chief Manufacturing Incorporated, Savage, MN (US)

( * ) Notice: Subject to any disclaimer, the term of this patent is extended or adjusted under 35 U.S.C. 154(b) by 52 days.

(21) Appl. No.: 09/819,346

(22) Filed: Mar. 28, 2001

(51) Int. Cl.$^7$ ............................................. F16M 11/00
(52) U.S. Cl. ..................... 248/370; 248/421; 248/631; 248/584; 248/585; 248/564
(58) Field of Search ................. 248/370, 421, 248/631, 584, 585, 564

(56) References Cited

U.S. PATENT DOCUMENTS

| | | |
|---|---|---|
| 322,515 A | 7/1885 | Young |
| 326,364 A | 9/1885 | Weston |
| 936,681 A | 10/1909 | Union |
| 1,819,516 A | 8/1931 | Kelly |
| 1,964,339 A | 6/1934 | Brassell |
| 2,435,755 A | 2/1948 | Schimpff |
| 2,933,198 A | 4/1960 | Firestone et al. |
| 3,032,308 A | 5/1962 | Hansen |
| 3,457,006 A | 7/1969 | Brown et al. |
| 3,759,475 A | 9/1973 | Brown |
| 4,060,292 A | 11/1977 | Medina |
| 4,093,364 A | 6/1978 | Miller |
| 4,160,999 A | 7/1979 | Claggett |
| 4,225,881 A | 9/1980 | Tovi |
| 4,313,208 A | 1/1982 | Kavenik |
| 4,412,601 A | 11/1983 | Cooper |
| 4,577,827 A | 3/1986 | Eliscu |
| 4,741,512 A * | 5/1988 | Elkuch et al. .............. 248/421 |
| 4,750,832 A | 6/1988 | Lloyd, Sr. et al. |
| 4,764,008 A | 8/1988 | Wren |
| 4,830,147 A | 5/1989 | Kawada |
| 4,843,782 A | 7/1989 | Gustaveson et al. |
| D307,814 S * | 5/1990 | Kawana ....................... D34/31 |
| 4,941,718 A | 7/1990 | Alexander, III et al. |
| 4,978,984 A | 12/1990 | Brookfield |
| 5,037,059 A | 8/1991 | Asano et al. |
| 5,240,220 A | 8/1993 | Elberbaum |
| 5,261,645 A | 11/1993 | Huffman |
| 5,310,152 A | 5/1994 | O'Neill |
| 5,366,203 A | 11/1994 | Huffman |
| 5,476,050 A * | 12/1995 | Zimmer et al. .............. 100/147 |
| 5,695,173 A * | 12/1997 | Ochoa et al. ............. 254/10 C |
| 5,829,948 A * | 11/1998 | Becklund ..................... 187/237 |
| 6,113,188 A * | 9/2000 | Stewart et al. .............. 297/339 |
| 6,182,796 B1 * | 2/2001 | Perlstein et al. ............ 187/208 |
| 6,427,607 B1 * | 8/2002 | Palmer ........................ 108/43 |

FOREIGN PATENT DOCUMENTS

DE 3120938 A1 2/1982

OTHER PUBLICATIONS

"Projector Lifts" from SVS Inc., 8 page product catalog, © 1995 Daniels Publishing Group, Inc.

(List continued on next page.)

Primary Examiner—Leslie A. Braun
Assistant Examiner—Ingrid Weinhold
(74) Attorney, Agent, or Firm—Faegre & Benson LLP (57) ABSTRACT

An extended travel lift system including a support frame and a display device frame. First and second arms are connected at first ends thereof by a hinge connector. A second end of the first arm is pivotally attached to a first slide mechanism on the support frame and a second end of the second arm is pivotally attached to the support frame. Third and fourth arms are connected at first ends thereof by the hinge connector. A second end of the third arm is pivotally attached to a second slide mechanism on the display device frame and a second end of the fourth arm is pivotally attached to the display device frame. A biasing mechanism is provided to bias the display device frame to an extended position. A height control mechanism is provided to retain the display device frame in either a retracted position or the extended position. The first and second arms are typically located in a first plane and the third and fourth arms are located in a second plane parallel to the first plane.

20 Claims, 11 Drawing Sheets

OTHER PUBLICATIONS

"Taking Video Projection to New Heights" 2 sheets by Display Devices, Inc.

"Control Systems for Video Projector Lifts," 1 sheet, ©1994 Draper Shade & Screen Co., Inc.

"Video Projector Lift Models VPL–20 and VPL–16", 2 sheets, ©1991 Stewart Filmscreen Corporation.

"Da–Lift Video Projector Lift" specification data sheet, 1 sheet, Da–Lite Screen Company, Inc.

Magna–Lift™ Electric Ceiling Mount, 4 sheets, Chief Manufacturing Inc.

"Magna–Series™ Electric Ceiling Lifts", 8 sheets, Chief Manufacturing Inc.

"DataLift, Data and Video Projector Mounting System", 2 sheets, Display Devices, Inc.

"DataLift Projector Display Devices", 4 sheets, Display Devices, Inc.

"Progressive Marketing PP–SIW, Dual Steel Cable Drive Hand Crank Portable Service/Install Winch System", 1 sheet, Progressive Marketing Products, Inc.

\* cited by examiner

EXTENDED TRAVEL LIFT MECHANISM FOR A FLAT PANEL DISPLAY

FIELD OF THE INVENTION

The present invention is directed to an extended lift mechanism for a display device, and in particular, to a portable extended travel lift mechanism for a flat panel display that permits a single operator to raise and lower the flat panel display to a desired height.

BACKGROUND OF THE INVENTION

Flat panel displays have become an increasingly popular substitute for projection devices and CRT's. The flat panel display is typically mounted on a structure, such as a wall. For some applications, a fragile flat panel display is move from location-to-location. The fragility of flat panel displays in combination with their weight make handling problematic.

Ideally, for both stationary and mobile applications the height of the flat panel display can be adjusted for optimum viewing. Various prior art positioning devices have been used, such as friction based hinges, mechanical linkages with springs or other biasing device, and various mechanical latches. The friction based devices need to be sufficiently strong to hold the relatively heavy flat panel displays, while being easy to operate. Friction based devices and mechanical latches typically require one person to hold the flat panel display at the correct height, while a second person engages the device. Additionally, movement in the upward direction requires the operator to lift a substantial portion of the weight of the flat panel display.

What is needed is a low-cost, easy to operate, and preferably portable system that permits a single operator to raise and lower the flat panel display to a desired height.

BRIEF SUMMARY OF THE INVENTION

The present invention is directed to an extended travel lift system for a flat panel display that permits a single operator to raise and lower the flat panel display to a desired height.

In one embodiment, the extended travel lift system includes a support frame and a display device frame. First and second arms are connected at first ends thereof by a hinge connector. A second end of the first arm is pivotally attached to a first slide mechanism on the support frame and a second end of the second arm is pivotally attached to the support frame. Third and fourth arms are connected at first ends thereof by the hinge connector. A second end of the third arm is pivotally attached to a second slide mechanism on the display device frame and a second end of the fourth arm is pivotally attached to the display device frame. A biasing mechanism is provided to bias the display device frame to an extended position. A height control mechanism is provided to retain the display device frame in either a retracted position or the extended position. The first and second arms are typically located in a first plane and the third and fourth arms are located in a second plane parallel to the first plane.

The extended travel lift system and the display device can be stored in a carrying case. In one embodiment, the carrying case comprises some or all of the support structure. The biasing mechanism can be a gas cylinder, spring, actuator or a variety of other devices. The biasing mechanism typically includes a first end pivotally attached to the support frame and a second end pivotally attached to one of the arms.

In one embodiment, the height control mechanism comprises a latched configured engaged with a toothed surface of a slot. In another embodiment, the height control mechanism comprises a lower end stop generally corresponding to the retracted position, an upper end stop generally corresponding to the extended position, and a plurality of intermediate stops corresponding to a plurality of positions between the retracted position and the extended position. When in a locked configuration, the height control mechanism retains the display device frame in the retracted position. The locked configuration also permits the display device frame to move in a shock-absorbing action.

In a released configuration, the height control mechanism permits the display device frame to move freely from the retracted position to the extended position. The height control mechanism preferably includes a plurality of intermediate stops that are automatically engaged as the display device frame is moved from the extended position to the retracted position. In one embodiment, the height control mechanism comprises a ratcheting mechanism that permits movement of the display device frame from the extended position to the retracted position.

The present invention is also directed to a portable display system comprising a display device and the present extended travel lift system.

DETAILED DESCRIPTION OF THE INVENTION

Figure 1:
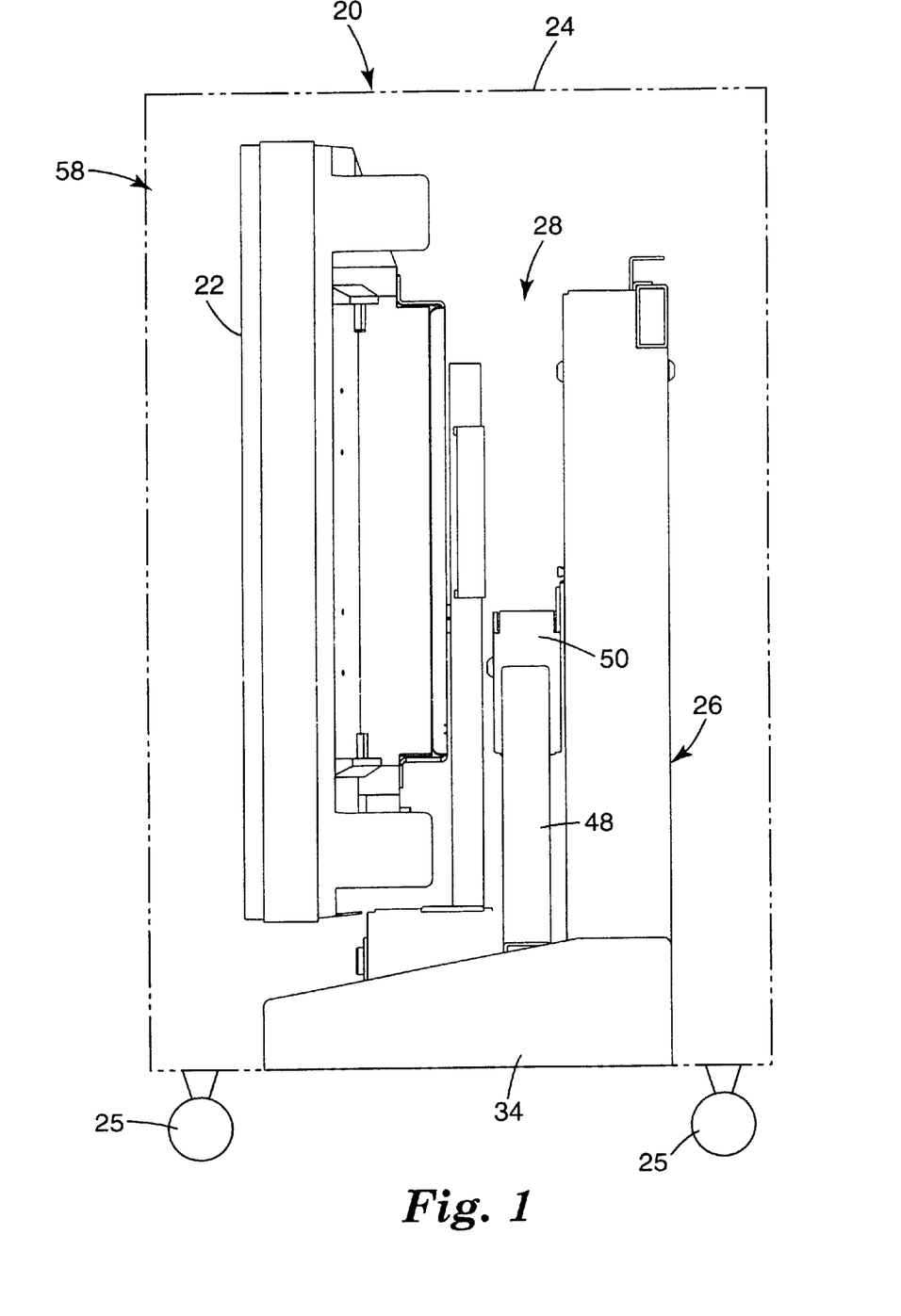
FIG. 1 is a side view of an extended travel lift mechanism in a retracted position in accordance with the present invention.
Figure 2:
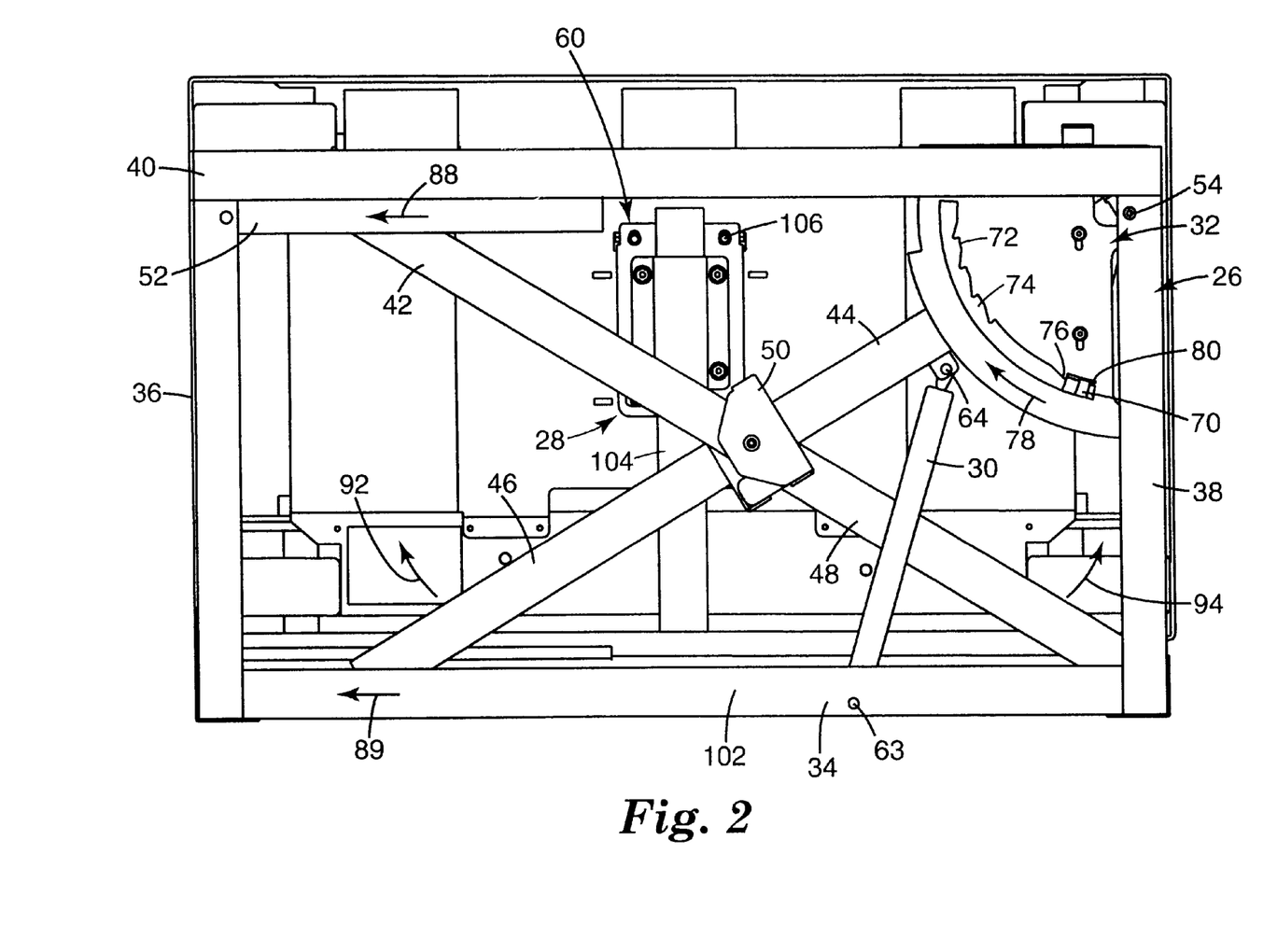
FIG. 2 is a rear view of the extended travel lift mechanism of FIG. 1.

FIGS. 1 and 2 are side and rear views, respectively, of an extended travel lift mechanism 20 that permits a single operator to raise and lower a display device 22. Although the display device 22 can be a CRT, flat panel display or projector, the present extended travel lift mechanism 20 is particularly well suited for use with flat panel displays. In the embodiment of FIG. 1, the extended travel lift mechanism 20 and display device 22 are stored and transported in a carrying case 24. The carrying case 24 can optionally include wheels 25.

In the illustrated embodiment, the extended travel lift mechanism 20 includes a support frame 26, a linkage mechanism 28, a biasing mechanism 30, a display device frame 60, and a height control mechanism 32. The support frame 26 typically includes a base 34, a pair of side supports 36, 38 and a top support 40. In one embodiment, the carrying case 24 comprises some or all of the support structure 26. The display device frame 60 includes a horizontal support 102 and a vertical support 104. The vertical support 104 includes a bracket 106 used to mount the displayed device to the displayed device frame 60.

The linkage mechanism 28 includes first and second arms 42, 44 connected at their first ends by hinge connector 50. The first and second arms 42, 44 are preferably in a first plane 43 (see FIG. 7). The second end of the first arm 42 is pivotally attached to first slide 52. The first slide 52 is mounted on the top support 40. The second end of the second arm 44 is pivotally attached at pivot point 54 located on the support frame 26.

The linkage mechanism 28 also includes third and fourth arms 46, 48 connected at their first ends by hinge connector 50. The third and fourth arms 46, 48 are preferably in plane 47 (see FIG. 7). The second end of the third arm 46 is pivotally attached to a second slide 56 mounted on a display device frame 60. The second end of the fourth arm 48 is attached to the display device frame 60 at pivot point 62 (see FIG. 5). Plane 43 containing the first and second arms 42, 44 is preferably parallel to plane 47 containing the third and fourth arms 46, 48 (see FIGS. 1 and 7).

As illustrated in FIG. 2, the third and fourth arms 46, 48 are configured in a downward shaped "V" when the extended travel lift mechanism 20 is in the retracted position 58. The first and second arms 42, 44 are configured in an upward facing "V". Since the arms 42, 44 are in a plane 43 separate and parallel to plane 47 containing arms 46, 48, the hinge connector 50 permits the first and second arms 42, 44 to be displaced into a downward facing "V" and the third and fourth arms 46, 48 into an upward facing "V" (see FIG. 10). The first and second slides 52, 56 permit the displacement of the arms 42, 44, 46, 48 to occur within the perimeter of the support frame 26. The amount of displacement permitted by the slides 52, 56 is determined by the length of the arms 42, 44, 46, 48.

In the illustrated embodiment, the biasing mechanism 30 is a gas spring attached to the base 34 at pivot 63 and to the second arm 44 at pivot 64. The biasing mechanism 30 can be attached to any of the arms 42, 44, 46, 48 and to a variety of locations on the support frame 26. The biasing mechanism 30 preferably generates enough force to allow a user to easily raise the display device 22 from the retracted position 58 to an extended position 66 (see FIGS. 5, 8, and 10). In another embodiment, the biasing mechanism 30 generates sufficient force to raise the display device 22 unassisted by the user. Biasing mechanism 30 can be a variety of structures, such as springs, actuators, pneumatic or hydraulic rams.

In the illustrated embodiment, the height control mechanism 32 is mounted to the support frame 26. Latch 70 is mechanically coupled to the second arm 44. The latch 70 is adapted to engage with surface 72 within slot 74. In the retracted position 58 illustrated in FIG. 2, the latch 70 is biased against the surface 72. Tooth 76 on the surface 72 prevents the latch 70 from moving in the first direction 78, while lower end stop 80 prevents the latch 70 from moving in the opposite direction. Engagement of the latch 70 with the lower end stop 80 comprises a fully retracted position. When the latch 70 is in the locked configuration illustrated in FIG. 2, the display device 22 cannot be raised, either by the biasing mechanism 30 or by a user.

The latch 70 is preferably smaller than the gap between the tooth 76 and the lower end stop 80 to permit some movement of the linkage mechanism 28. Slight movement of the display device 22 and the linkage mechanism 28 within the support frame 26 provides a shock-absorbing action that minimizes damage to the display device 22 during handling and transport. Consequently, in the retracted position 58 illustrated in FIG. 2 the display device 22 is generally within the perimeter of the support frame 26, but is not in the filly retracted position. In the illustrated embodiment, the distance between the tooth 76 and the lower end stop 80 in relation to the size of the latch 70 allows the display device 22 to move about a few inches.

Figure 3:
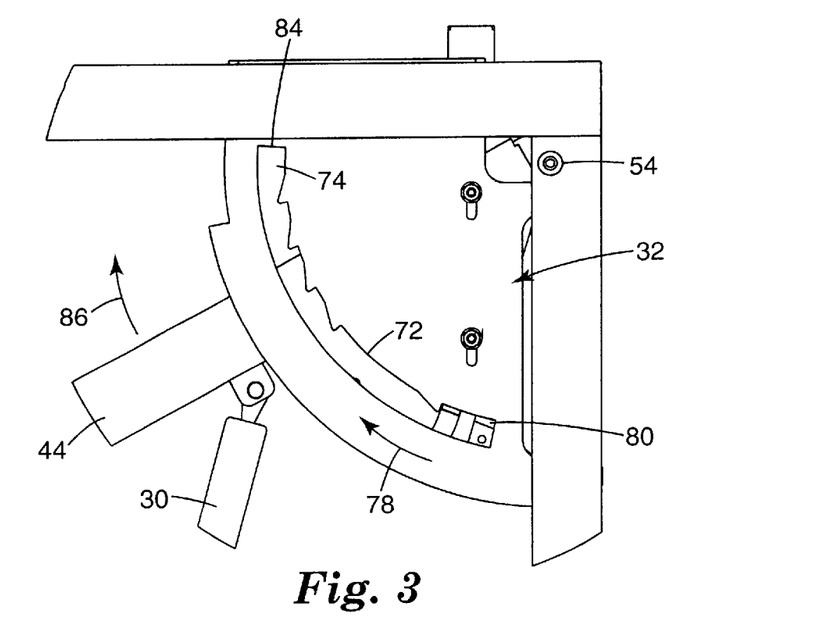
FIG. 3 is an enlarged view of a height control mechanism for the extended lift mechanism of FIG. 1.

FIG. 3 illustrates the height control mechanism 32 of FIG. 2 with the latch 70 in a released configuration 82. In the released configuration 82, the latch 70 is moved away from the surface 72 to permit it to pass the tooth 76 and progress in the first direction 78. In the preferred embodiment, the latch 70 remains in the released configuration 82 until it contacts upper end stop 84 at the far end of the slot 74.

Figure 5:
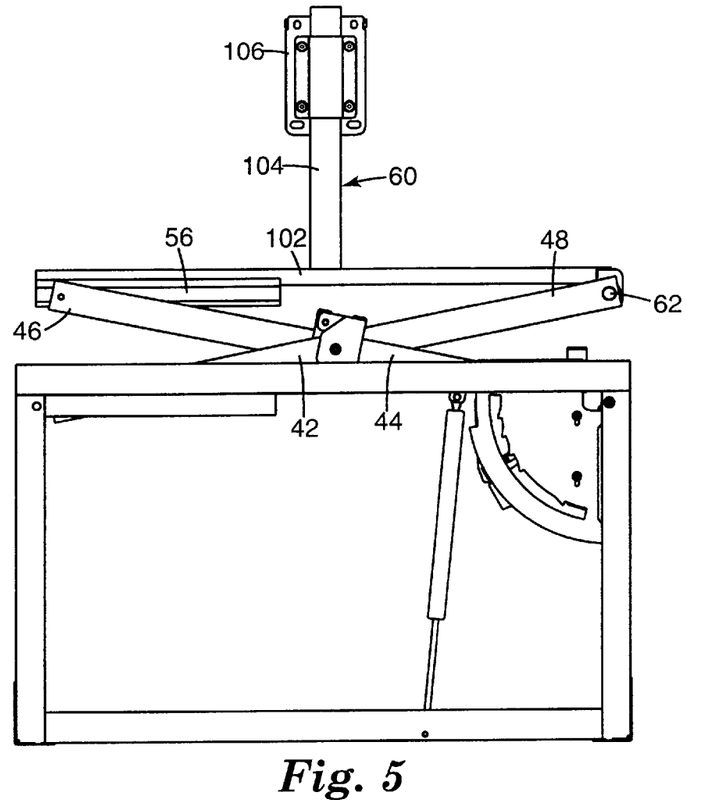
FIG. 5 is a rear view of the extended travel lift mechanism of FIG. 4.
Figure 8:
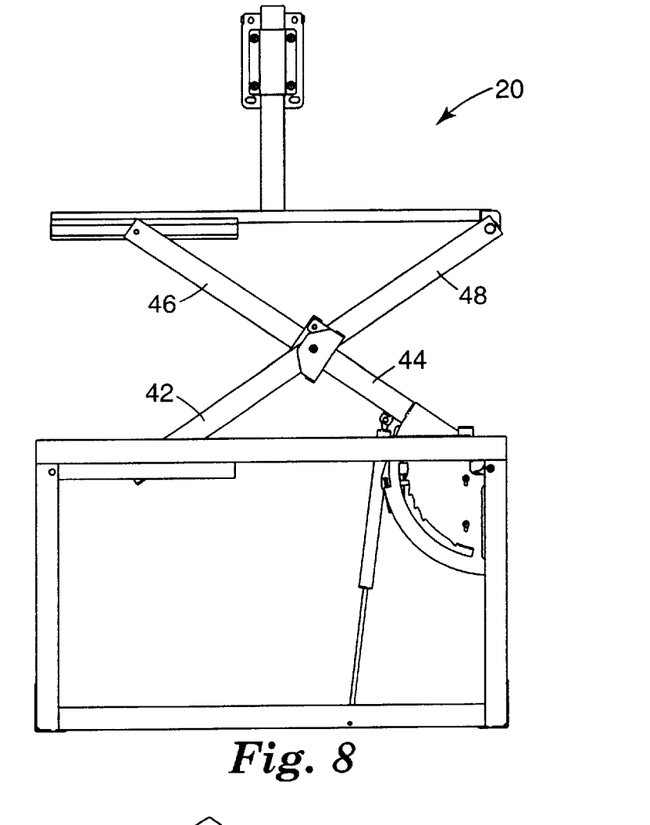
FIG. 8 is a rear view of the extended travel lift mechanism of FIG. 7.
Figure 10:
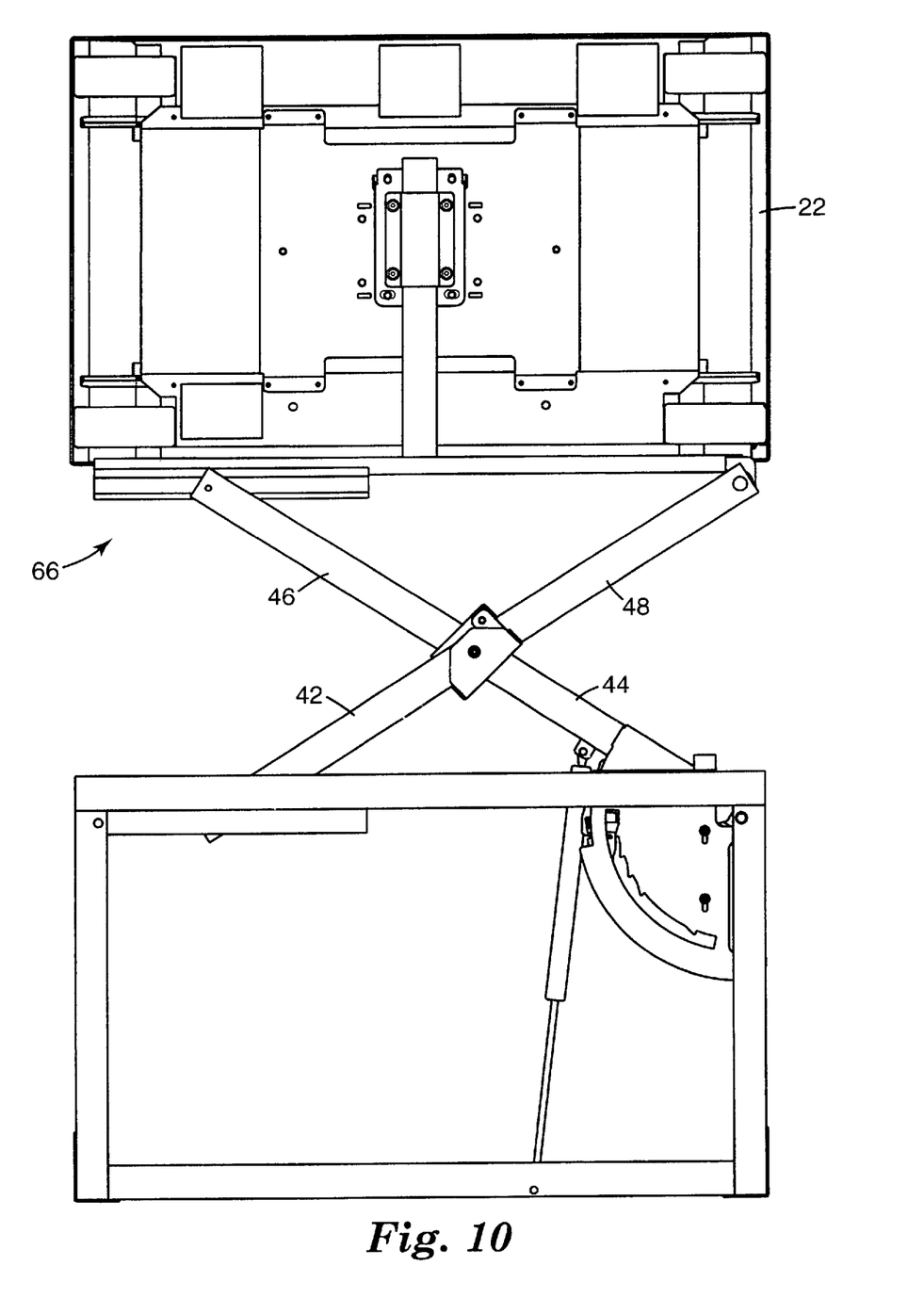
FIG. 10 is a rear view of the extended travel lift mechanism of FIG. 1 in an extended position.
Figure 11:
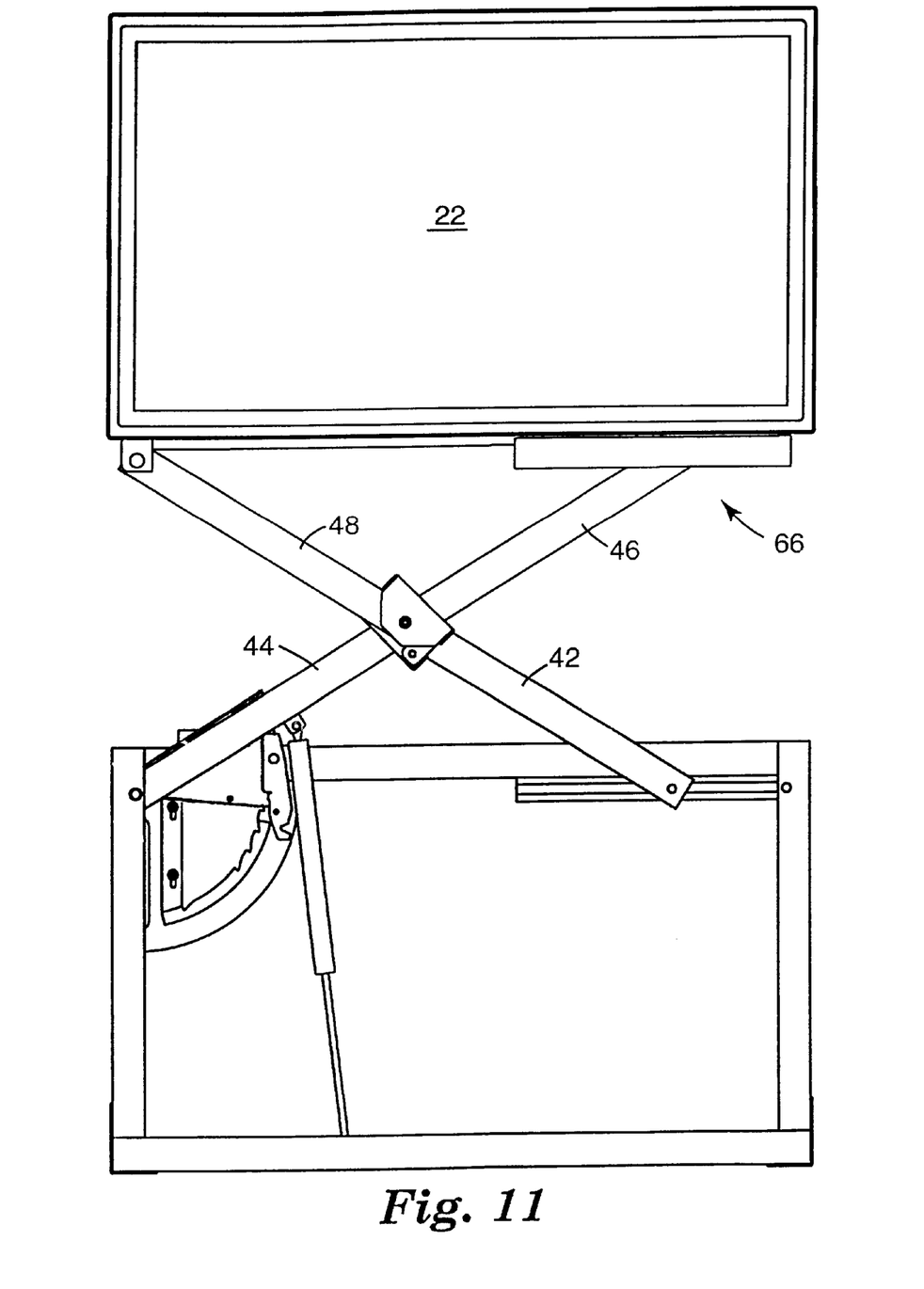
FIG. 11 is a front view of the extended travel lift mechanism of FIG. 10.
Figure 12:
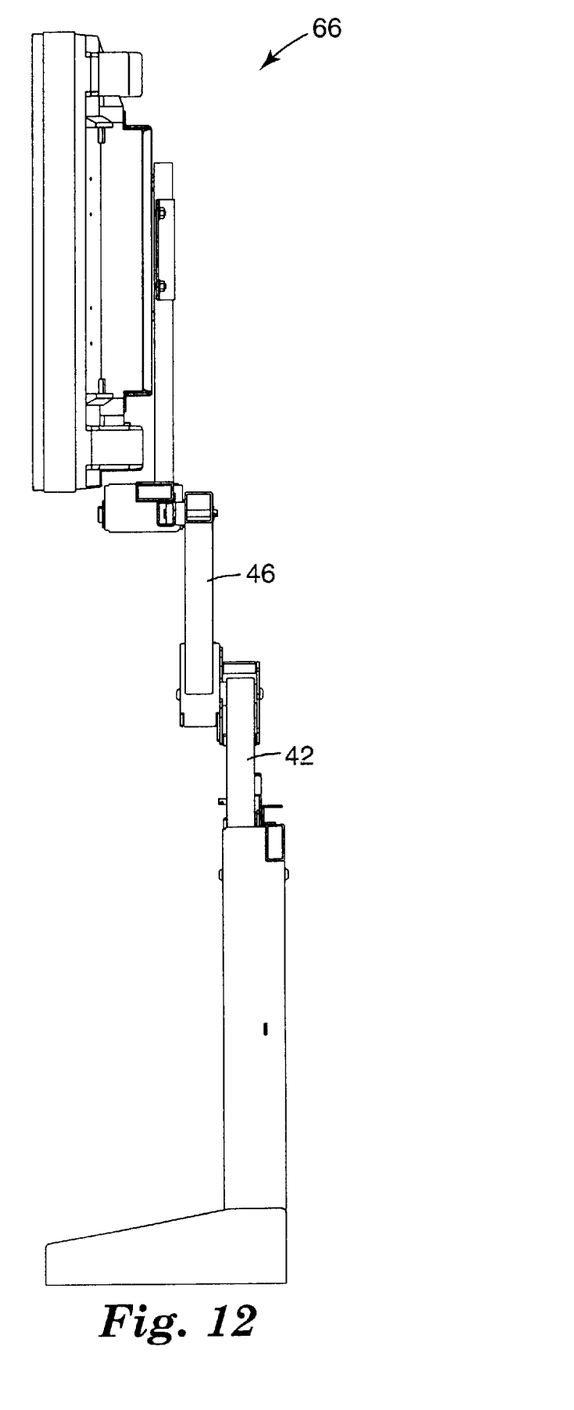
FIG. 12 is a side view of the extended travel lift mechanism of FIG. 10.

Once the latch 70 is in the released configuration 82, the biasing mechanism 30 biases the second arm 44 towards an extended position (see FIGS. 5, 8 and 10). Movement of the second arm 44 in the direction 86 causes the first arm 42 to slide in the direction 88 within the first slide 52. Simultaneously, the second end of the third arm 46 will slide in a direction 89 within the second slide 56, causing the third arm to rotate in a direction 92 and the fourth arm 48 to rotate in a direction 94. The downward "V" of the arms 46, 48 and the upward "V" of the arms 42, 44 will simultaneously flatten. Eventually, the arms 46, 48 will be aligned in a straight configuration. Similarly, the arms 42, 44 will be aligned in a straight configuration. Since the arms 42, 44 are in a separate parallel plane from the arms 46, 48, their respective "V" shaped configurations can be reversed.

Figure 4:
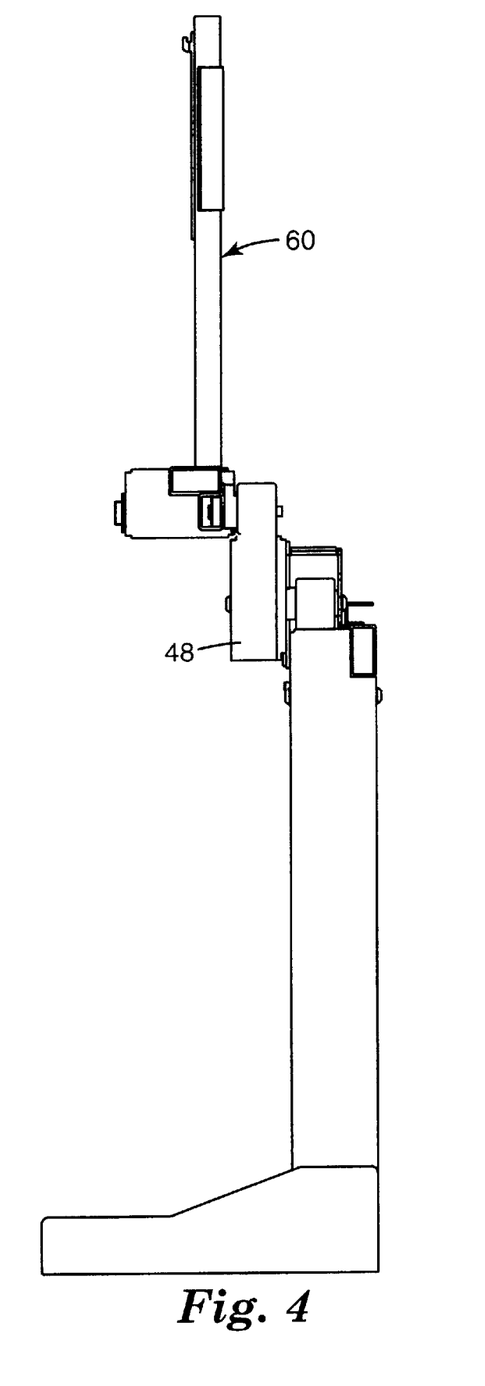
FIG. 4 is a side view of the extended travel lift mechanism of FIG. 1 in a partially extended position.
Figure 6:
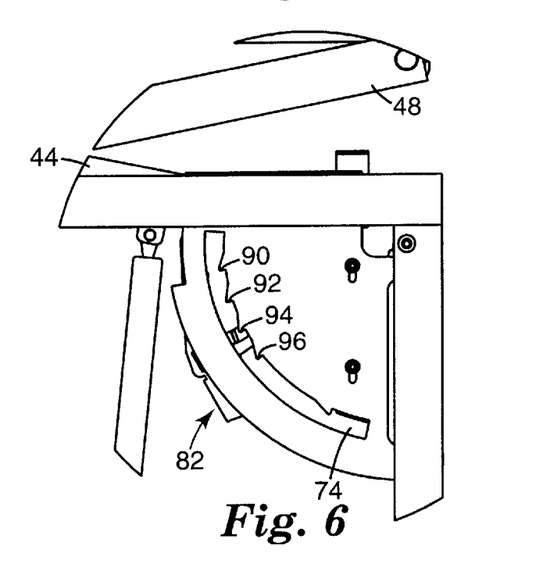
FIG. 6 is an enlarged view of the height control mechanism of FIG. 5.

FIGS. 4 through 6 illustrate the extended travel lift mechanism 20 moving from the retracted position 58 of FIGS. 1 and 2 to a more extended position. The display device 22 is removed to better illustrate the operation of the device 20. As best illustrated in FIG. 5, the arms 42, 44 are now in the opposite configuration than illustrated in FIG. 2. In particular, the arms 42, 44 now form a downward shaped V, while the arms 46, 48 form an upward shaped V. As illustrated in FIG. 6, the latch 70 is still in the disengaged position, which allows the latch 70 to progress within the slot 74 without engaging teeth 90, 92, 94, 96 on the surface 72.

Figure 7:
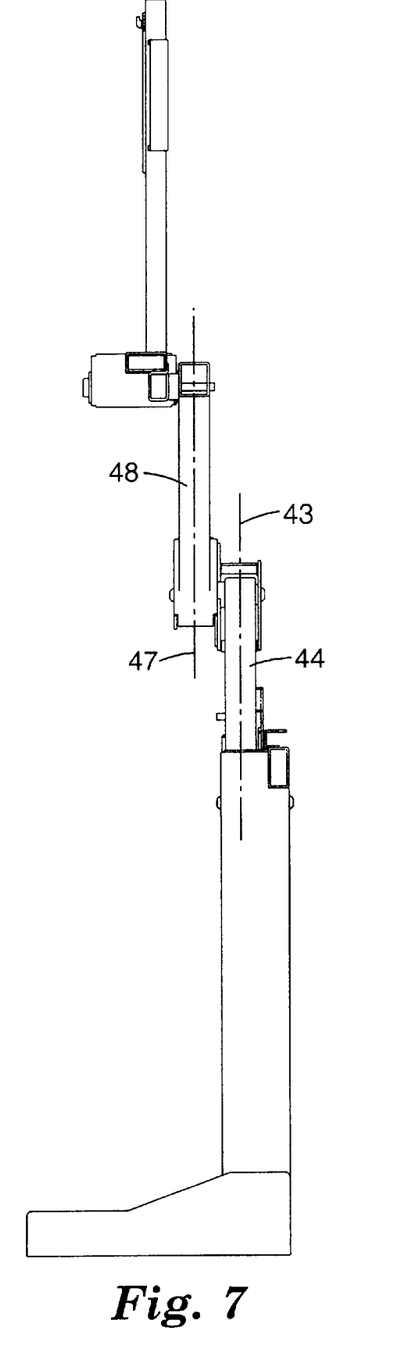
FIG. 7 is a side view of the extended travel lift mechanism of FIG. 1 in a further extended position.
Figure 9:
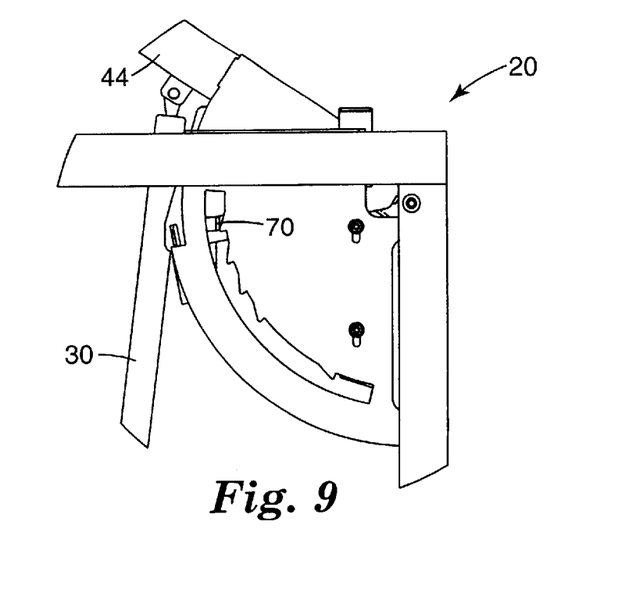
FIG. 9 is an enlarged view of the height control mechanism of FIG. 8.

FIGS. 7 through 9 illustrate the extended travel lift mechanism 20 of the present invention in a more extended position than illustrated in FIGS. 4 through 6. The latch 70 is still in the disengaged position and the biasing mechanism 30 continues to bias the second arm 44, and hence the entire linkage mechanism 28, to a more extended position.

Figure 13:
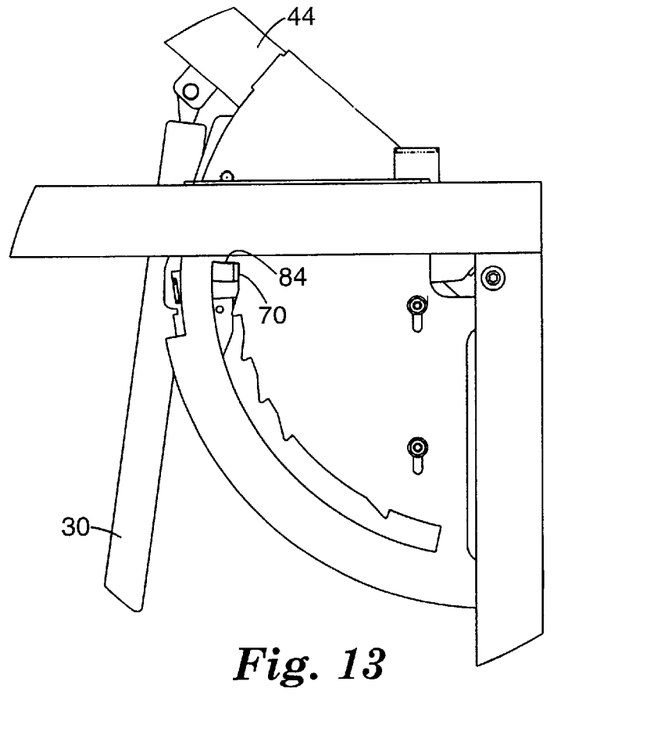
FIG. 13 is an enlarged view of the height control mechanism of FIG. 10.

FIGS. 10 through 13 illustrate the present extended travel lift mechanism 20 in the fully extended position 66. The fully extended position 66 refers to the latch 70 engaged with the upper end stop 84. The biasing mechanism 30 biases the latch 70 against the upper end stop 84 in the fully extended position 66. As illustrated in FIG. 13, once the latch 70 engages the upper ends stop 84, the latch automatically returns to the locked configuration and is biased against the surface 72.

Figure 14:
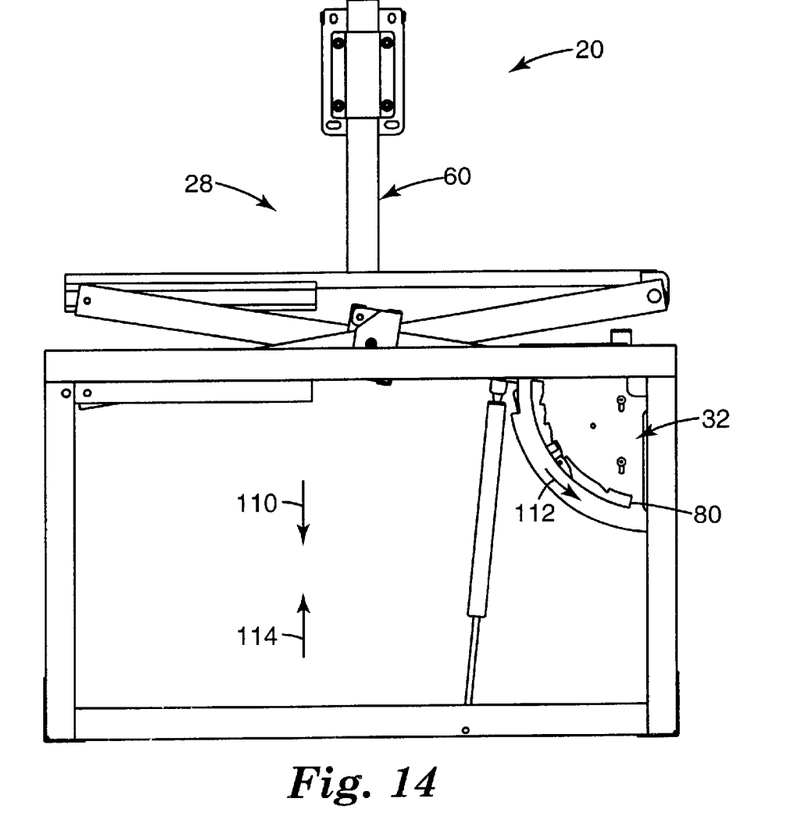
FIG. 14 is a rear view of the extended travel lift mechanism of FIG. 1 partially retracted.
Figure 15:
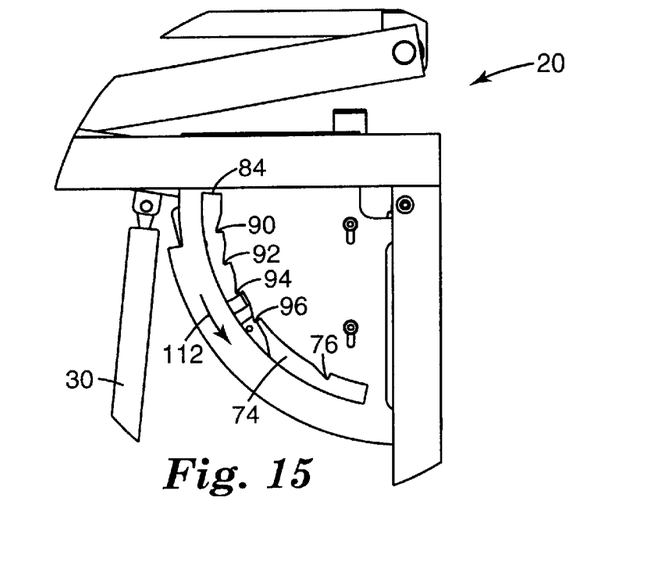
FIG. 15 is an enlarged view of the height control mechanism of FIG. 14.

FIGS. 14 and 15 illustrate movement of the present extended travel lift mechanism 20 from the extended position 66 towards the retracted position 58 (see FIG. 1). As discussed in connection with FIG. 13, the latch 70 is in the locked configuration and biased against the surface 72. The latch is also biased against the upper end stop 84 by the biasing mechanism 30.

As the displayed panel frame 60 is moved downward in the direction 110, the linkage mechanism 28 moves in the opposite direction described above. The latch 70 slides along the surface 72 within the slot 74 over each of the teeth 90, 92, 94, 96 in a ratcheting action. As used herein, "ratcheting" refers to a tooth structure operating with a catch so as to move in only a single direction. In the present embodiment, the latch 70 operates as the catch that can be moved only in the direction 112. That is, engagement of the latch 70 with one of the teeth 90, 92, 94, 96 prevents movement in the direction 114.

The operator has the option to press the displayed device frame 60 downward until the latch 70 engages with a tooth 90, 92, 94, 96 corresponding to the desired height. The biasing mechanism 30 biases the latch 70 upward in the direction 78 against the selected tooth to retain the display device 22 at that height. When the operator is finished with the displayed device 22, the displayed device frame 60 is simply pressed downwards against the upwardly biasing force of the biasing mechanism 30 until the latch 70 engages with the tooth 76. Engagement of the latch 70 with the tooth 76 returns the device 20 to the retracted position 58 of FIG. 1.

All of the patents and patent applications disclosed herein, including those set forth in the Background of the Invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

What is claimed is:

1. An extended travel lift system for a display device, the apparatus comprising:
   a support frame;
   a display device frame;
   first and second arms connected at first ends thereof by a hinge connector, a second end of the first arm pivotally attached to a first slide mechanism on the support frame and a second end of the second arm pivotally attached to the support frame;
   third and fourth arms connected at first ends thereof by the hinge connector, a second end of the third arm pivotally attached to a second slide mechanism on the display device frame and a second end of the fourth arm pivotally attached to the display device frame, wherein the first and fourth arms are separate components to permit the first arm to be above the fourth arm in a retracted position and below the fourth arm in an extended position;
   a biasing mechanism adapted to bias the display device frame to an extended position; and
   a height control mechanism adapted to retain the display device frame in either a retracted position or the extended position.

2. The apparatus of claim 1 wherein the first and second arms are located in a first plane and the third and fourth arms are located in a second plane parallel to the first plane.

3. The apparatus of claim 1 comprising a carrying case sized to receive the extended travel lift system in the retracted position and the display device.

4. The apparatus of claim 1 wherein the biasing mechanism comprises a gas cylinder.

5. The apparatus of claim 1 wherein the biasing mechanism comprises a first end pivotally attached to the support frame and a second end pivotally attached to one of the arms.

6. The apparatus of claim 1 wherein the height control mechanism comprises a latch configured to engage with a toothed surface of a slot.

7. The apparatus of claim 1 wherein the height control mechanism comprises:
   a lower end stop generally corresponding to the retracted position;
   an upper end stop generally corresponding to the extended position; and
   a plurality of intermediate stops corresponding to a plurality of positions between the retracted position and the extended position.

8. The apparatus of claim 1 wherein the height control mechanism in a locked configuration retains the display device frame in the retracted position.

9. The apparatus of claim 8 wherein the locked configuration permits the display device frame to move in a shock-absorbing action.

10. The apparatus of claim 1 wherein the height control mechanism in a released configuration permits the display device frame to move freely from the retracted position to the extended position.

11. The apparatus of claim 1 wherein the height control mechanism comprises a plurality of intermediate stops that are automatically engaged as the display device frame is moved from the extended position to the retracted position.

12. The apparatus of claim 1 wherein the height control mechanism comprises a ratcheting mechanism that permits movement of the display device frame from the extended position to the retracted position.

13. A portable lift system for a display device, the apparatus comprising:
   a carrying structure adapted to receive the lift system and the display device;
   a display device frame;
   first and second arms connected at first ends thereof by a hinge connector, a second end of the first arm pivotally attached to a first slide mechanism on the carrying structure and a second end of the second arm pivotally attached to the carrying structure;
   third and fourth arms connected at first ends thereof by the hinge connector, a second end of the third arm pivotally attached to a second slide mechanism on the display device frame and a second end of the fourth arm pivotally attached to the display device frame;
   a biasing mechanism adapted to bias the display device frame to an extended position; and
   a height control mechanism adapted to retain the display device frame in either a retracted position or the extended position.

14. A portable display system comprising:
   a display device;
   an extended travel lift system for a display device, the apparatus comprising:
      a support frame;
      a display device frame;
      first and second arms connected at first ends thereof by a hinge connector, a second end of the first arm pivotally attached to a first slide mechanism on the support frame and a second end of the second arm pivotally attached to the support frame;
      third and fourth arms connected at first ends thereof by the hinge connector, a second end of the third arm pivotally attached to a second slide mechanism on the display device frame and a second end of the fourth arm pivotally attached to the display device frame, wherein the first and fourth arms are separate components to permit the first arm to be above the fourth arm in a retracted position and below the fourth arm in an extended position;
      a biasing mechanism adapted to bias the display device frame to an extended position; and
      a height control mechanism adapted to retain the display device frame in either a retracted position or the extended position.

15. The portable display system of claim 14 comprising a carrying case substantially containing the display device and the extended travel lift system.

16. An extended lift system for a display device, the apparatus comprising:
   a support frame;
   a display device frame;
   first and second arms connected at first ends thereof by a hinge connector, a second end of the first arm pivotally attached to a first slide mechanism on the support frame and a second end of the second arm pivotally attached to the support frame, wherein the first and second arms are located in the same plane;
   third and fourth arms connected at first ends thereof by the hinge connector, a second end of the third arm pivotally attached to a second slide mechanism on the display device frame and a second end of the fourth arm pivotally attached to the display device frame;
   a biasing mechanism adapted to bias the display device frame to an extended position; and
   a height control mechanism adapted to retain the display device frame in either a retracted position or the extended position.

17. An extended travel lift system for a display device, the apparatus comprising:
   a support frame;
   a display device frame;
   first and second arms connected at first ends thereof by a hinge connector, a second end of the first arm pivotally attached to a first slide mechanism on the support fame and a second end of the second arm pivotally attached to the support frame;
   third and fourth arms connected at first ends thereof by the hinge connector, a second end of the third arm pivotally attached to a second slide mechanism on the display device frame and a second end of the fourth arm pivotally attached to the display device frame, wherein the third and fourth arms are located in the same plane;
   a biasing mechanism adapted to bias the display device frame to an extended position; and
   a height control mechanism adapted to retain the display device frame in either a retracted position or the extended position.

18. An extended travel lift system for a display device, the apparatus comprising:
   a support frame;
   a display device frame;
   first and second arms connected at first ends thereof by a hinge connector, a second end of the first arm pivotally attached to a first slide mechanism on the support frame and a second end of the second arm pivotally attached to the support frame;
   third and fourth arms connected at first ends thereof by the hinge connector, a second end of the third arm pivotally attached to a second slide mechanism on the display device frame and a second end of the fourth arm pivotally attached to the display device frame;
   a biasing mechanism adapted to bias the display device frame to an extended position;
   a height control mechanism adapted to retain the display device frame in either a retracted position or the extended position; and
   a carrying case sized to receive the extended travel lift system in the retracted position and the display device.

19. An extended travel lift system for a display device the apparatus comprising:
   a support frame;
   a display device frame;
   first and second arms connected at first ends thereof by a hinge connector, a second end of the first arm pivotally attached to a first slide mechanism on the support frame and a second end of the second arm pivotally attached to the support frame;

third and fourth arms connected at first ends thereof by the hinge connector, a second end of the third arm pivotally attached to a second slide mechanism on the display device frame and a second end of the fourth arm pivotally attached to the display device frame;

a biasing mechanism adapted to bias the display device frame to an extended position; and a height control mechanism adapted to retain the display device frame in either a retracted position or the extended position, wherein the height control mechanism includes a lower end stop generally corresponding to the retracted position; an upper end stop generally corresponding to the extended position; and a plurality of intermediate stops corresponding to a plurality of positions between the retracted position and the extended position.

20. An extended travel lift system for a display device, the apparatus comprising:

a support frame;

a display device frame;

first and second arms connected at first ends thereof by a hinge connector, a second end of the first arm pivotally attached to a first slide mechanism on the support frame and a second end of the second arm pivotally attached to the support frame;

third and fourth arms connected at first ends thereof by the hinge connector, a second end of the third arm pivotally attached to a second slide mechanism on the display device frame and a second end of the fourth arm pivotally attached to the display device frame;

a biasing mechanism adapted to bias the display device frame to an extended position; and a height control mechanism adapted to retain the display device frame in either a retracted position or the extended position, wherein the height control mechanism includes a plurality of intermediate stops that are automatically engaged as the display device frame is moved from the extended position to the retracted position.

* * * * *